US007008155B2

(12) United States Patent
Smith et al.

(10) Patent No.: US 7,008,155 B2
(45) Date of Patent: Mar. 7, 2006

(54) DUNNAGE AIR BAG WITH IMPROVED ADHESIVE BONDING OF PAPER PLIES WITHIN THE VICINITY OF THE INFLATION VALVE

(75) Inventors: Rodney S. Smith, Franklin, TN (US); Thomas C. Keenan, Franklin, TN (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/734,240

(22) Filed: Dec. 15, 2003

(65) Prior Publication Data

US 2005/0129479 A1 Jun. 16, 2005

(51) Int. Cl.
*B60P 7/08* (2006.01)
(52) U.S. Cl. ..................... 410/119; 410/125
(58) Field of Classification Search ............... 410/118, 410/119, 125; 141/313, 314, 68; 206/522, 206/593; 383/109, 113; 137/224–225, 231–232; 428/35.2
See application file for complete search history.

(56) References Cited

U.S. PATENT DOCUMENTS

| | | | | |
|---|---|---|---|---|
| 3,426,891 A | * | 2/1969 | Marks | 410/119 |
| 3,442,402 A | * | 5/1969 | Baxter | 410/119 |
| 3,808,981 A | | 5/1974 | Shaw | |
| 4,146,070 A | | 3/1979 | Angarola et al. | |
| 4,591,519 A | | 5/1986 | Liebel | |
| 5,042,541 A | | 8/1991 | Krier et al. | |
| 5,082,244 A | | 1/1992 | Krier et al. | |
| 5,111,838 A | | 5/1992 | Langston | |
| 5,288,188 A | * | 2/1994 | Vance | 410/119 |
| 5,839,488 A | | 11/1998 | Peters | |
| 6,138,711 A | | 10/2000 | Lung-Po | |
| 6,435,787 B1 | * | 8/2002 | John | 410/119 |

* cited by examiner

*Primary Examiner*—Stephen Gordon
(74) *Attorney, Agent, or Firm*—Schwartz & Weinrieb

(57) ABSTRACT

A dunnage or cargo air bag has incorporated therein a pair of glue or adhesive bonding strips which are located within the immediate vicinity of the inflation valve assembly so as to operatively cooperate with a folded edge portion of the dunnage or cargo air bag and a stitched or sewn edge portion of the dunnage or cargo air bag and thereby effectively surround or circumscribe the inflation valve assembly. In this manner, the plurality of paper plies are able to be effectively secured in a substantially flattened state upon the four sides surrounding the inflation valve assembly whereby the portion of each one of the plurality of paper plies, which effectively forms or defines the inner, annular periphery or rim wall portion of each one of the apertures, holes, or openings through which, for example, the tubular body member of the inflation valve assembly projects outwardly, will not be disposed within the vicinity of the external thread portions of the tubular body member of the inflation valve assembly so as not to effectively interfere with the threaded engagement and secured mounting of the internally threaded closure cap upon the externally threaded tubular body member of the inflation valve assembly.

16 Claims, 3 Drawing Sheets

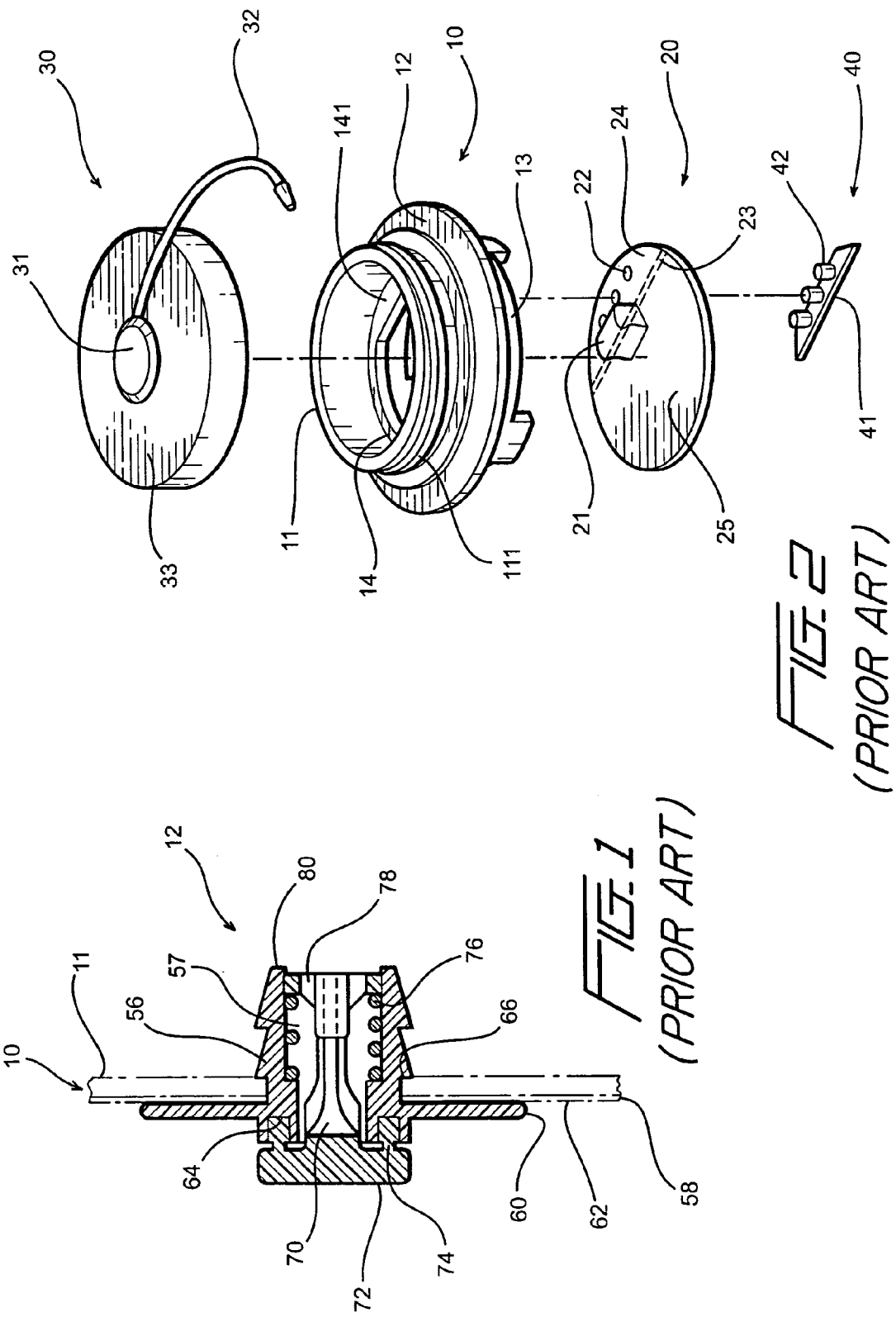

DUNNAGE AIR BAG WITH IMPROVED ADHESIVE BONDING OF PAPER PLIES WITHIN THE VICINITY OF THE INFLATION VALVE

FIELD OF THE INVENTION

The present invention relates generally to cargo or dunnage air bags which are used within the cargo shipment or transportation industry as a means for readily and easily securing or bracing cargo within the holds of, for example, railroad cars, ships, airplanes, truck trailers, and similar cargo containers, and more particularly to a new and improved technique for adhesively bonding together the paper plies of the cargo or dunnage air bag within the vicinity of the inflation valve assembly, which is mounted in a sealed manner upon the inflatable bladder member disposed internally within the cargo or dunnage air bag and which comprises a threaded valve body portion which projects externally outwardly from the cargo or dunnage air bag in order to facilitate or enable inflation and deflation of the cargo or dunnage air bag, so as to effectively prevent the paper plies from substantially separating from each other within the immediate vicinity of the inflation valve assembly whereby such separated paper plies could, for example, effectively become positioned or engaged within individual thread regions of the threaded valve body portion of the inflation valve assembly and thereby interfere with the threaded mounting of the threaded closure cap upon the threaded valve body portion when, for example, inflation of the cargo or dunnage air bag is completed and it is desired to maintain the cargo or dunnage air bag in its inflated state or condition such that the cargo or dunnage air bag can be used to secure or brace the cargo loads within the cargo holds of the cargo containers.

BACKGROUND OF THE INVENTION

Cargo or dunnage air bags are used within the cargo shipment or transportation industry as a means for readily and easily securing or bracing cargo within the holds of, for example, railroad cars, ships, airplanes, truck trailers, and the like. Such dunnage or cargo air bags conventionally comprise an inflatable bladder which is enclosed within an outer bag or envelope which is conventionally fabricated from a plurality of paper plies. The air bags are conventionally of such construction and size as to readily enable the same to be inserted into voids or spaces defined between spaced loads, or between a particular cargo load and a side or end wall of the cargo container or hold, whereupon inflation of the air bag, the air bag will expand thereby fixedly engaging the adjacent cargo loads, or the cargo load and the container wall, so as to secure the cargo loads against undesirable movement during transit. Obviously, in order to achieve the inflation of the cargo or dunnage air bags to a predetermined pressurized level, such air bags are also conventionally provided with an inflation valve assembly so as to permit pressurized air or compressed air to be conducted into the interior portion of the inflatable bladder so as to inflate the same, or to permit the pressurized air or compressed air, already disposed within the inflated bladder, to be exhausted out from the interior portion of the inflatable bladder so as to deflate the same.

A first conventional PRIOR ART inflation valve assembly is disclosed, for example, within FIG. 1 which substantially corresponds to the inflation valve assembly portion of FIG. 2 as illustrated within U.S. Pat. No. 5,042,541 which issued to Krier et al. on Aug. 27, 1991, and as shown within FIG. 1 of the noted patent to Krier et al., the inflation valve assembly, generally indicated by the reference character 12, is adapted to be positioned within a corner region of the cargo air bag which is generally indicated by the reference character 10. The cargo air bag 10 is seen to comprise a paper bag 11 and an inflatable bladder 62, and the inflation valve assembly 12 is seen to comprise a tubular valve body 56 defining a hollow space 57 therewithin, and an annular flange portion 60 integrally fixed thereto. The tubular valve body 56 is adapted to be inserted through an aperture defined within a wall 58 of the cargo air bag 10 such that the free distal end 80 of the valve body 56 projects outwardly from the cargo air bag 10 so as to be externally accessible for fluidic communication with a suitable air inflation fixture or assembly by means of which the compressed or pressurized air can be conducted into the interior portion of the inflatable bladder 62. An external annular shoulder portion 66 of the valve body 56 engages an outer surface of the air bag 10, while the annular flange portion 60 is adapted to be ultrasonically welded to an interior wall portion of the inflatable bladder 62 so as to form an air-tight seal therewith.

The inflation valve assembly 12 also comprises a valve stem 70 which extends through the hollow space 57 of the valve body 56. A closure plate 72 is disposed upon a first end of the valve stem 70, and a spring member 76 is interposed between an internal shoulder portion of the valve body 56 and a second opposite end 78 of the valve stem 70. An annular valve seat 64 is defined upon an interior portion of the valve body 56, and an annular ridge 74 is defined upon the closure plate 72. Accordingly, the spring member 76 normally biases the closure plate 72 and its annular ridge 74 onto the valve seat 64 such that the inflation valve assembly 12 may be disposed in a first CLOSED position or state whereby pressurized air or compressed air cannot be conducted into the interior of the inflatable bladder 62, or alternatively, pressurized air or compressed air, already contained within the inflated bladder 62, is not permitted to escape from the inflated bladder 62. Conversely, when a force is imposed upon the free end portion 78 of the valve stem 70, the valve stem 70 is axially moved against the biasing force of spring member 76 such that the closure plate 72 and its annular ridge 74 are moved away from the valve seat 64 such that the inflation valve assembly 12 may be disposed in a second OPENED position or state whereby pressurized air or compressed air can be conducted into the interior of the inflatable bladder 62, or alternatively, pressurized air or compressed air already contained within the inflated bladder 62 is permitted to escape from the inflated bladder 62.

In lieu of the spring-biased valve stem mechanism as disclosed within the inflation valve assembly of Krier et al., the inflation valve assembly may alternatively comprise a second conventional PRIOR ART type inflation valve assembly wherein a flapper valve member is mounted upon the inner end portion of a tubular valve body so as to likewise be movable between, for example, a first CLOSED position or state, either by means of the inherent resiliency of, for example, a living hinge structure, or as a result of being biased to the CLOSED state or position by means of the internal pressure present within the inflatable bladder when the interior portion of the inflatable bladder has actually been pressurized, whereby, in either case, the flapper valve member will be disposed upon a suitable valve seat, and a second OPEN state or position as a result of, for example, the flapper valve member being manually manipulated whereby the flapper valve member is able to effectively be moved away from its valve seat, so as to permit an inflation nozzle to be fluidically mated therewith, whereby pressurized or compressed air can be introduced into the interior of the inflatable bladder of the dunnage or cargo air bag. Once the interior of the inflatable bladder has in fact been pressurized and inflated to the desired state, the internal pressurized air is able to be effectively and sufficiently retained within the interior of the inflatable bladder of the dunnage or cargo air bag as a result of, for example, the threaded engagement of an external closure cap upon the inflation valve assembly which effectively closes and seals the inflation valve assembly.

A second conventional PRIOR ART inflation valve assembly, of the aforenoted type, that is, one which comprises a flapper valve member, is disclosed, for example, within FIG. 2 which essentially corresponds to FIG. 1 of U.S. Pat. No. 6,138,711 which issued to Lung-Po on Oct. 31, 2000. From an overall point of view, it is seen that the second conventional PRIOR ART flapper type inflation valve assembly comprises a valve block or valve body assembly 10, a flapper valve assembly 20, a valve cap assembly 30, and a fastener assembly 40 for securing the flapper valve assembly 20 to an underside portion of the valve block or valve body assembly 10. More particularly, the valve block or valve body assembly 10 comprises an upstanding tubular body portion 11, a dependent body portion 13, and an external annular flange member 12 disposed at an axial elevational position interposed between the upper and lower body portions 11,13. The external annular flange member 12 is adapted to be sealed to an inflatable member, such as, for example, the inflatable bladder of a dunnage air bag, by means of a suitable ultrasonic sealing technique, and the inner wall portion of the valve block or valve body assembly 10 is provided with an internal annular flange member 14 at an axial elevational position which substantially corresponds to that of the external annular flange member 12.

A portion of the internal annular flange member 14 includes a shelf member 141 upon which a mounting bracket portion 24 of the flapper valve assembly 20 is fixedly mounted by means of a plurality of plug rods 42 which project upwardly from a base member 41 of the fastening assembly 40 so as to extend through a plurality of apertures 22 defined within the mounting bracket portion 24 of the flapper valve assembly 20. In addition, it is seen that the flapper valve assembly 20 comprises a movable flapper valve member 25 which is integrally connected to the fixed mounting bracket portion 24 of the flapper valve assembly 20 by means of a living hinge type structure 23. The movable flapper valve member 25 is adapted to be engage the undersurface portion of the internal annular flange member 14, which therefore effectively serves as a valve seat member, when the flapper type inflation valve assembly is to be disposed at its CLOSED position. It is further appreciated that the external periphery of the upstanding tubular body portion 11 is threaded as at 111, and a cap member 33, of the valve cap assembly 30, is adapted to be threadedly mated upon the externally threaded portion 111 of the upper body portion 11. A connecting element 32 is connected at one end thereof to the cap member 33 as at 31 and is adapted to be connected at its opposite end to the valve block or valve body assembly 10 such that the cap member 33 is always connected to the valve block or valve body assembly 10 and cannot therefore be lost or separated from the valve block or valve body assembly 10.

Continuing further, a typical, conventional, PRIOR ART dunnage or cargo air bag 50, as disclosed within FIG. 3, and which corresponds in part to FIG. 4 of U.S. Pat. No. 3,808,981 which issued to Shaw on May 7, 1974, is seen to comprise an inflatable bladder 52 which is encased within a plurality of paper plies 55,56,57,58,59,60. In order to inflate the inflatable bladder 52, it is seen that the dunnage or cargo air bag assembly further comprises an inflation valve assembly, generally indicated by means of the reference character 90, which is mounted within the dunnage or cargo air bag assembly such that an internal gas distributor portion 120 of the inflation valve assembly 90 is disposed internally within the inflatable bladder 52, while a cylindrical housing portion 91 extends through apertures, respectively formed within side wall portions of the inflatable bladder 52 and each one of the multiple paper plies 55,56,57,58,59, 60, so as to be fluidically connectable to a source of pressurized or compressed air. The inflation valve assembly 90 further comprises an annular flange portion 96 which comprises an upper sealing surface 97 which is adapted to be heat sealed to an internal wall portion of the inflatable bladder 52, and an abutment surface 99 upon which the annular flange portion 122 of the gas distributor 120 is adapted to be mounted in a heat-sealed manner. The gas distributor 120 comprises a frusto-conical shell portion 121 and an end piece 123 within which a plurality of air-flow apertures 125 are defined. A valve member 105 is movably mounted within the cylindrical housing portion 91 of the valve assembly 90 so as to normally be mounted upon a valve seat 100 under the influence of a biasing spring 115. In this manner, when a suitable source of pressurized or compressed air is fluidically connected to the valve assembly 90, pressurized or compressed air can be conducted into the interior of the inflatable bladder 52 as schematically illustrated by means of the arrows 130,135.

With reference now being made to FIG. 4, an additional conventional, PRIOR ART dunnage or cargo air bag is disclosed and is generally indicated by the reference character 110. It is seen, or to be appreciated, that the dunnage or cargo air bag 110 is similar to the dunnage or cargo air bag 50 as disclosed within the aforenoted patent to Shaw, in that the same comprises an inflation valve assembly 112 which is adapted to be fluidically connected to the internal inflatable bladder, not shown, and which extends outwardly through the inflatable bladder, not shown, as well as through the enveloping paper plies, only the outermost one of which is disclosed at 114, so as to be capable of conducting pressurized or compressed air into the inflatable bladder, not shown, or alternatively, to permit the pressurized air, already disposed within the inflatable bladder, to be exhausted outwardly from the inflatable bladder. It is to be appreciated, however, that in lieu of the inflation valve assembly 90 as disclosed within the aforenoted patent to Shaw, the inflation valve assembly 112 is similar to the inflation valve assembly as disclosed within FIG. 2 which, of course, corresponds to the inflation valve assembly as disclosed within the aforenoted patent to Lung-Po. More particularly, it is seen that the inflation valve assembly 112 comprises an externally threaded tubular body member 116, and in addition, an internally threaded closure cap 118 is adapted to be threadedly engaged with the externally threaded tubular body member 116 of the inflation valve assembly 112 when, for example, the dunnage or cargo air bag 110 has been inflated to the desired state and it is desired to maintain the dunnage or cargo air bag 110 in such inflated state.

Regardless of the particular or specific structure of the inflation valve assembly, however, and as can be readily appreciated still further from FIG. 4, it is seen that when the apertures, holes, or openings are formed within, for example, each one of the plurality of paper plies comprising the dunnage or cargo air bag 110 so as to permit the inflation valve assembly 112 to project outwardly therethrough in order to be readily accessible to the source of compressed or pressurized inflation air, not shown, it sometimes happens that the portion of each one of the plurality of paper plies, which effectively forms or defines the inner, annular periphery or rim wall portion 120 of each aperture, opening, or hole, as exemplified in connection with the outermost paper ply 114, will not always inherently remain in a substantially flattened state within the vicinity of the annular flange portion of the inflation valve assembly 112. To the contrary, that portion of each one of the plurality of paper plies, which effectively forms or defines the inner, annular periphery or rim wall portion 120 of each aperture, hole, or opening, will sometimes tend to effectively move or be disposed away from the annular flange portion of the inflation valve assembly 112 so as to be disposed within the immediate vicinity of, and even become engaged with, individual thread portions of the externally threaded tubular body member 116. Accordingly, it can be appreciated further that the portion of each one of the plurality of paper plies, which effectively forms or defines the inner, annular periphery or rim wall portion 120 of each aperture, opening, or hole, will sometimes tend to effectively interfere with the threaded engagement and mounting of the threaded closure cap 118 onto the threaded tubular body member 116 of the inflation valve assembly 112 whereby proper closure and sealing of the inflation valve assembly 112 cannot be properly or assuredly attained or achieved.

While suitable auxiliary securing means or implements, such as, for example, an annular grommet similar to that disclosed at 70 within FIG. 3, and as more fully disclosed within the aforenoted patent to Shaw, have been employed so as to effectively control or counteract this phenomenon, whereby one leg portion 71 of the grommet 70 is disposed upon the outermost paper ply 60 while the other leg portion 72 of the grommet is interposed between the innermost paper ply 55 and the inflatable bladder 52, such securing means or implements do not necessarily provide a viable solution to the aforenoted problem in that the installation of, for example, the grommet 70 upon the dunnage or cargo air bag assembly 50 requires an additional operation not normally incorporated within the processing line for fabricating or manufacturing the dunnage or cargo air bag assembly. In addition, since the grommet 70 comprises a separate and independent component or implement which is to be secured, mounted upon, or attached to the dunnage or cargo air bag assembly 50, it is necessary to maintain a suitable supply or inventory for such grommet components. Still further, in view of the fact that the grommet 70 comprises a separate component or implement which is to be secured, mounted upon, or attached to the dunnage or cargo air bag assembly 50, additional measures must be implemented so as to ensure the fact that such separate and independent components or implements are not lost or otherwise unavailable at the particular installation station.

Accordingly, a need exists in the art for a new and improved dunnage or cargo air bag wherein each one of the multiplicity of paper plies, comprising the dunnage or cargo air bag assembly and encasing the inflation valve assembly, can be appropriately secured, without the need for auxiliary implements or fixation members or means, within the vicinity of the inflation valve assembly such that the portion of each one of the plurality of paper plies, which effectively forms or defines the inner, annular periphery or rim wall portion of each one of the apertures, holes, or openings, through which, for example, the tubular body member of the inflation valve assembly projects outwardly, will not be disposed within the vicinity of the external thread portions of the tubular body member of the inflation valve assembly so as not to effectively interfere with the threaded engagement and secure mounting of the internally threaded closure cap upon the externally threaded tubular body member of the inflation valve assembly.

OBJECTS OF THE INVENTION

Accordingly, it is an object of the present invention to provide a new and improved dunnage or cargo air bag.

Another object of the present invention is to provide a new and improved dunnage or cargo air bag which has structure incorporated therein which effectively overcomes the various operational disadvantages or drawbacks characteristic of conventional PRIOR ART dunnage or cargo air bags.

An additional object of the present invention is to provide a new and improved dunnage or cargo air bag wherein unique and novel adhesive bonding structure is incorporated within the dunnage or cargo air bag assembly so as to enhance the securing together of the plurality of paper plies which envelop the inflatable bladder member of the dunnage or cargo air bag assembly.

A further object of the present invention is to provide a new and improved dunnage or cargo air bag wherein unique and novel adhesive bonding structure is incorporated within the dunnage or cargo air bag assembly so as to enhance the securing together of the plurality of paper plies, which envelop the inflatable bladder member of the dunnage or cargo air bag assembly, within the immediate vicinity of the inflation valve assembly.

A last object of the present invention is to provide a new and improved dunnage or cargo air bag wherein unique and novel adhesive bonding structure is incorporated within the dunnage or cargo air bag assembly so as to enhance the securing together of the plurality of paper plies, which envelop the inflatable bladder member of the dunnage or cargo air bag assembly, within the immediate vicinity of the inflation valve assembly so as to effectively maintain the plurality of paper plies in a substantially flattened state within the immediate vicinity of the inflation valve assembly whereby the portion of each one of the plurality of paper plies, which effectively forms or defines the inner, annular periphery or rim wall portion of each one of the holes, apertures, or openings through which, for example, the tubular body member of the inflation valve assembly projects outwardly, will not be disposed within the vicinity of the external thread portions of the tubular body member of the inflation valve assembly so as not to effectively interfere with the threaded engagement and secure mounting of the internally threaded closure cap upon the externally threaded tubular body member of the inflation valve assembly.

SUMMARY OF THE INVENTION

The foregoing and other objectives are achieved in accordance with the teachings and principles of the present invention through the provision of a new and improved dunnage or cargo air bag wherein, in accordance with the principles and teachings of the present invention, a pair of glue or adhesive bonding strips are effectively provided upon the dunnage or cargo air bag within the immediate vicinity of the inflation valve assembly. More particularly, since the inflation valve assembly is normally disposed or positioned within a corner region of the dunnage or cargo air bag, wherein a first edge region of the dunnage or cargo air bag, which partially defines the corner region of the dunnage or cargo air bag, is formed by means of end portions of the plurality of paper plies which are folded over upon themselves, while a second edge region of the dunnage or cargo air bag, which cooperates with the folded edge region of the dunnage or cargo air bag so as to likewise partially define the corner region of the dunnage or cargo air bag, is formed by means of suitable stitching forming a sewn or stitched seam portion, then in accordance with the principles and teachings of the present invention, the adhesive bonding or glue strips are disposed or positioned opposite the aforenoted folded and sewn edge portions of the dunnage or cargo air bag. In this manner, the folded edge portion of the dunnage or cargo air bag, in conjunction with the sewn or stitched edge portion of the dunnage or cargo air bag, as well as in conjunction with the pair of adhesive or glue strips, define a fixation pattern which has a substantially square-shaped configuration and which circumscribes the inflation valve assembly. As a result of the aforenoted fixation pattern, the plurality of paper plies are able to be effectively secured in a substantially flattened state upon the four sides surrounding the inflation valve assembly whereby the portion of each one of the plurality of paper plies, which effectively forms or defines the inner, annular periphery or rim wall portion of each one of the apertures, holes, or openings through which, for example, the tubular body member of the inflation valve assembly projects outwardly, will not be disposed within the vicinity of the external thread portions of the tubular body member of the inflation valve assembly so as not to effectively interfere with the threaded engagement and secured mounting of the internally threaded closure cap upon the externally threaded tubular body member of the inflation valve assembly.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein:

FIG. 1 is a cross-sectional view of a first embodiment of a conventional, PRIOR ART inflation valve assembly as mounted within an inflatable bladder of a dunnage or cargo air bag;

FIG. 2 is an exploded view of a second embodiment of a conventional, PRIOR ART inflation valve assembly for use within an inflatable bladder of a dunnage or cargo air bag;

DETAILED DESCRIPTION OF THE PREFERRED EMBODIMENT

Figure 5:
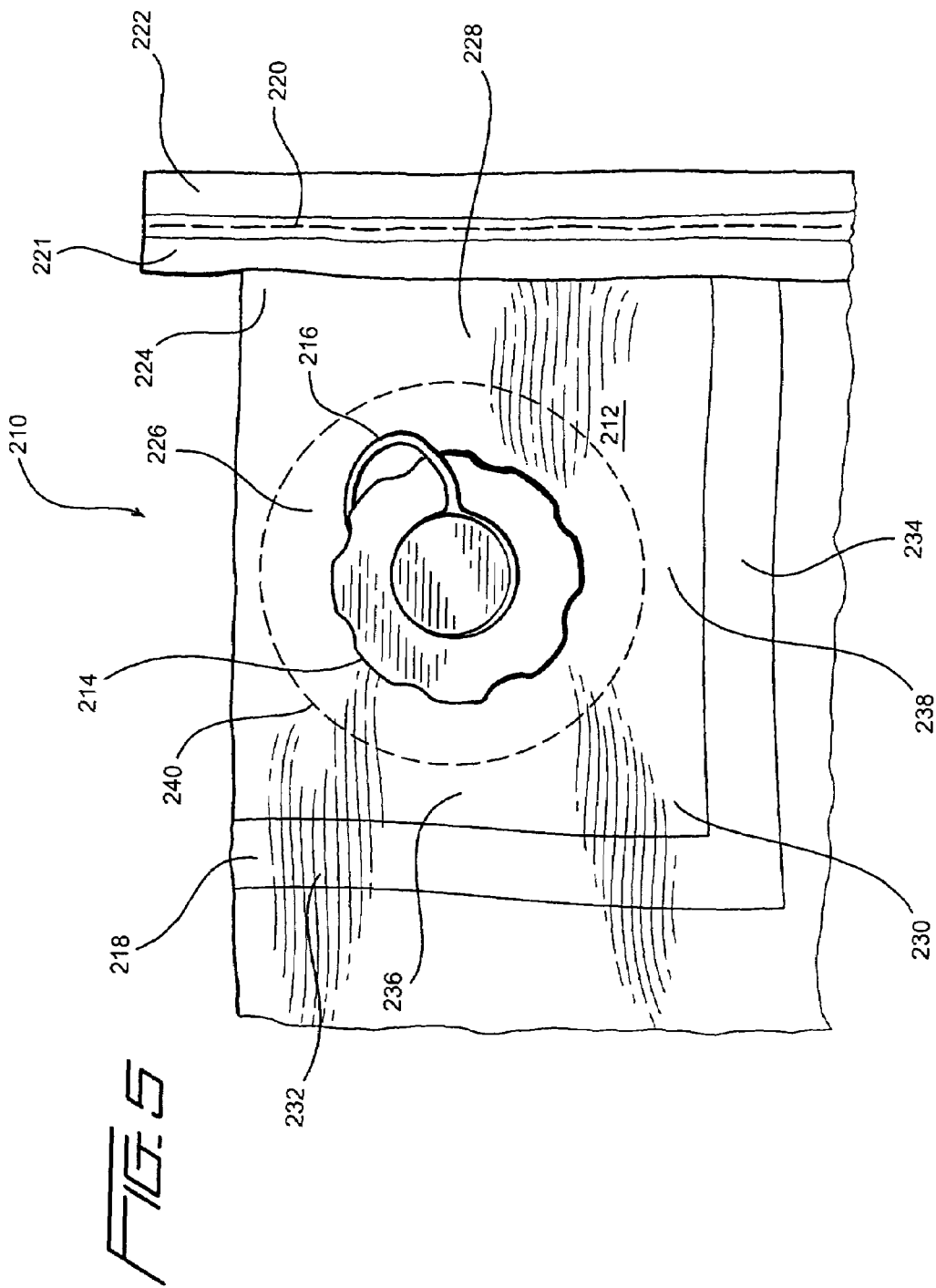
FIG. 5 is a top plan view of a new and improved dunnage or cargo air bag constructed in accordance with the principles and teachings of the present invention, and having an inflation valve assembly incorporated therein, wherein a unique and novel adhesive bonding or glue pattern has been incorporated within the dunnage or cargo air bag of the present invention so as to effectively maintain the portion of each one of the plurality of paper plies, which effectively forms or defines the inner, annular periphery or rim wall portion of the aperture hole, or opening through which, for example, the tubular body member of the inflation valve assembly projects outwardly, in a substantially flattened state so as not to be disposed within the vicinity of the external thread portions of the tubular body member of the inflation valve assembly whereby such peripheral or rim portions of the plurality of paper plies cannot interfere with the threaded engagement and secured mounting of the internally threaded closure cap upon the externally threaded tubular body member of the inflation valve assembly.

Referring now to the drawings, and more particularly to FIG. 5 thereof, a new and improved dunnage or cargo air bag, constructed in accordance with the principles and teachings of the present invention, is disclosed and is generally indicated by the reference character 210. More particularly, it is seen, and to be appreciated, that the new and improved dunnage or cargo air bag 210 of the present invention is similar to the dunnage or cargo air bag 50, as disclosed within the aforenoted patent to Shaw, in that the same comprises an inflation valve assembly, which is not actually shown but which is adapted to be fluidically connected to an internal inflatable bladder, which is also not shown. The inflation valve assembly extends outwardly through the inflatable bladder, as well as through a plurality of enveloping paper plies, only the outermost one of which is disclosed at 212, so as to be capable of conducting pressurized or compressed air into the inflatable bladder, or alternatively, to permit the pressurized air, already disposed within the inflatable bladder, to be exhausted outwardly from the inflatable bladder.

Figure 3:
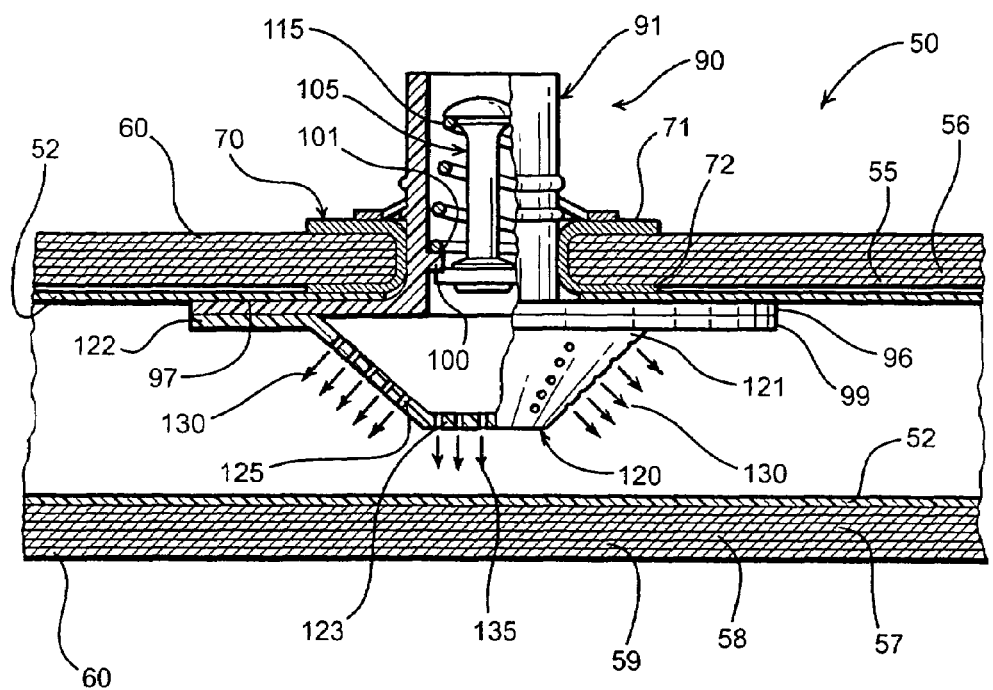
FIG. 3 is a cross-sectional view of a third embodiment of a conventional, PRIOR ART inflation valve assembly mounted within an inflatable bladder of a dunnage or cargo air bag and showing the outward projection of the inflation valve body member through the multiple paper plies comprising the dunnage or cargo air bag.
Figure 4:
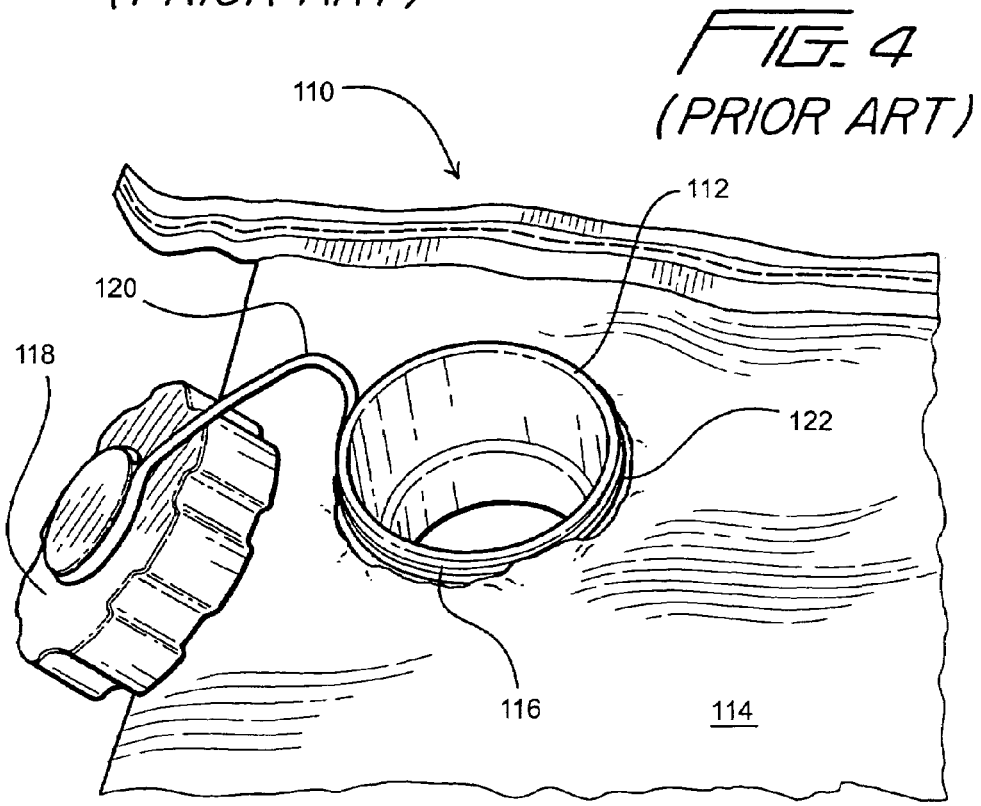
FIG. 4 is a perspective view of a fourth embodiment of a conventional PRIOR ART inflation valve assembly, similar to the second embodiment conventional PRIOR ART inflation valve assembly as disclosed within FIG. 2 showing, however, the mounted disposition of the inflation valve assembly within a multiple paper ply dunnage or cargo air bag wherein the innermost portions of at least some of the plurality of paper plies, which effectively form or define the inner, annular periphery or rim wall portion of the aperture hole, or opening through which, for example, the tubular body member of the inflation valve assembly projects outwardly, are seen to be disposed within the vicinity of the external thread portions of the tubular body member of the inflation valve assembly whereby such innermost portions of the plurality of paper plies will effectively interfere with the threaded engagement and secured mounting of the internally threaded closure cap onto the externally threaded tubular body member of the inflation valve assembly.

It is to be further appreciated that in lieu of the inflation valve assembly as disclosed within the aforenoted patent to Shaw, the inflation valve assembly incorporated in the new and improved dunnage or cargo air bag 210 of the present invention is similar to the inflation valve assembly as disclosed within FIGS. 2 and 4 and which, of course, corresponds or is similar to the inflation valve assembly as disclosed within the aforenoted patent to Lung-Po. More particularly, it is to be appreciated that the inflation valve assembly utilized within the new and improved dunnage or cargo air bag 210 of the present invention comprises an externally threaded tubular body member upon which an internally thread, ed closure cap 214 is adapted to be threadedly engaged when, for example, the dunnage or cargo air bag 210 has been inflated to the desired state and it is desired to maintain the dunnage or cargo air bag 210 in such inflated state. As was the case with the internally threaded closure cap 118 as disclosed in connection with the conventional PRIOR ART dunnage or cargo air bag assembly 110 as disclosed within FIG. 2, the internally threaded closure cap 214 is likewise adapted to be secured to the inflation valve assembly, not shown, by means of a suitable tether member 216.

It has been noted hereinbefore that when the apertures, holes, or openings are formed within, for example, each one of the plurality of paper plies comprising the dunnage or cargo air bag 210 so as to permit the inflation valve assembly to project outwardly therethrough in order to be readily accessible to the source of compressed or pressurized inflation air, not shown, it sometimes happens that the portion of each one of the plurality of paper plies, which effectively forms or defines the inner annular periphery or rim wall portion of each aperture, opening, or hole, will not always inherently remain in a substantially flattened state within the vicinity of the annular flange portion of the inflation valve assembly. To the contrary, the portion of each one of the plurality of paper plies, which effectively forms or defines the inner annular periphery or rim wall portion of each aperture, hole, or opening, will sometimes tend to effectively move or be disposed away from the annular flange portion of the inflation valve assembly so as to be disposed within the immediate vicinity of, and even become engaged with, individual thread portions of the externally threaded tubular body member. Accordingly, it has also been noted that the portion of each one of the plurality of paper plies, which effectively forms or defines the inner annular periphery or rim wall portion of each aperture, opening, or hole, will sometimes tend to effectively interfere with the threaded engagement and mounting of the threaded closure cap 214 upon the threaded tubular body member of the inflation valve assembly whereby proper closure and sealing of the inflation valve assembly cannot normally be properly or assuredly attained or achieved.

Therefore, in accordance with the principles and teachings of the present invention, a unique and novel technique has been developed for in fact ensuring that the portion of each one of the plurality of paper plies, which effectively forms or defines the inner annular periphery or rim wall portion of each aperture, opening, or hole, will tend to remain in a substantially flattened state within the vicinity of the annular flange portion of the inflation valve assembly such that the portion of each one of the plurality of paper plies, which effectively forms or defines the inner annular periphery or rim wall portion of each aperture, opening, or hole, will not effectively move or be disposed away or remote from the annular flange portion of the inflation valve assembly. In this manner, such portions will not be disposed within the immediate vicinity of, or become engaged with, individual thread portions of the externally threaded tubular body member whereby the portion of each one of the plurality of paper plies, which effectively forms or defines the inner annular periphery or rim wall portion of each aperture, opening, or hole, will not effectively tend to interfere with the threaded engagement and mounting of the threaded closure cap 214 onto the threaded tubular body member of the inflation valve assembly whereby proper closure and sealing of the inflation valve assembly can in fact normally be properly or assuredly attained or achieved.

More particularly, as can best be appreciated from FIG. 5, when the dunnage or cargo air bag 210 is fabricated or manufactured in accordance with current techniques, the plurality of paper plies, as exemplified by and including the outermost one of the plurality of paper plies 212, are folded over upon themselves, in a manner similar to that illustrated within the aforenoted patent to Shaw, so as to effectively define a first closed or sealed side edge portion 218. In addition, an end portion of the dunnage or cargo air bag 210 is closed or sealed as a result of stitching 220 an enveloping fabric 221 along the end portion of the dunnage or cargo air bag 210 so as to effectively define a stitched or sewn end edge portion 222. Accordingly, it can be appreciated that such structure, described so far as being characteristic of the dunnage or cargo air bag 210, corresponds substantially to that of the conventional PRIOR ART dunnage or cargo air bag 110 as disclosed within FIG. 4. Furthermore, it can be additionally appreciated that the corner region of the dunnage or cargo air bag, within which the inflation valve assembly, as exemplified by means of the internally threaded closure cap 214, is located, is effectively defined or partially circumscribed by means of a corner edge region 224 which is defined by means of the intersection of the side and end edge portions 218,222 of the dunnage or cargo air bag 210. Continuing further, it can likewise be appreciated that, as a result of the formation or definition of the folded, closed or sealed side edge portion 218 within the dunnage or cargo air bag 210, and particularly in view of the structural cooperation of the folded, closed or sealed side edge portion 218 with the stitched or sewn, closed or sealed end edge portion 222 as defined by means of the sewing or stitching together of the plurality of paper plies by means of the stitched fabric 221, those portions or regions 226 of the plurality of paper plies which are interposed between the folded, closed or sealed side edge portion 218 and the inflation valve assembly, as exemplified by means of the closure cap 214, will tend to lie or be disposed in a substantially flattened state.

This phenomenon is likewise substantially true with respect to those portions or regions 228 of the plurality of paper plies which are interposed between the stitched or sewn, closed or sealed end edge portion 222 and the inflation valve assembly, as exemplified by means of the closure cap 214, that is, such portions or regions 228 of the plurality of paper plies of the dunnage or cargo air bag 210 will also tend to lie or be disposed in a substantially flattened condition or state, particularly in view of the structural cooperation defined between the stitched or sewn, closed or sealed end edge portion 222, as defined by means of the sewing or stitching together of the plurality of paper plies by means of the stitched fabric 221, and the folded, closed or sealed side edge portion 218. As can best be appreciated from the new and improved dunnage or cargo air bag 210 as disclosed within FIG. 5, particularly when compared with the conventional PRIOR ART dunnage or cargo air bag 110 as disclosed within FIG. 4, and prior to the incorporation of the unique and novel structure, characteristic of the present invention, into the new and improved dunnage or cargo air bag 210 of the present invention, those regions 230 of the plurality of paper plies, which are effectively disposed diametrically opposite the corner edge region 224, as well as those regions which are disposed diametrically opposite the folded, closed or sealed side edge portion 218 and the stitched or sewn, closed or sealed end edge portion 222, will not normally be disposed, or tend to lie, within a substantially flattened state in view of the fact that the conventional PRIOR ART dunnage or cargo air bag does not have structure incorporated within such regions which would otherwise tend to cause the plurality of paper plies disposed within such regions to be disposed in the flattened state as do the folded side edge structure 218 and the stitched or sewn end edge structure 222.

In accordance then with the unique and novel structure and technique characteristic of the present invention, a pair of adhesive bonding or glue strips 232,234, interposed between successive pairs of adjacent plies of the plurality of paper plies, are oriented within the overall structure comprising the dunnage or cargo air bag 210 so as to respectively extend inwardly from the folded, closed or sealed side edge portion 218, as well as from the sewn or stitched, closed or sealed end edge portion 222, so as to intersect each other within an internal region of the dunnage or cargo air bag 210 and thereby effectively partially circumscribe what is now the corner regions 230 of the plurality of paper plies. Considered alternatively, the adhesive bonding or glue strips 232,234 are disposed perpendicular to each other and are respectively disposed parallel to the sewn or stitched, closed or sealed end edge portion 222 and the folded, closed or sealed side edge portion 218 of the dunnage or cargo air bag 210. Accordingly, in view of the fact that the corner regions 230 are now, in effect, partially circumscribed by means of the pair of adhesive bonding or glue strips 232,234, the pair of adhesive bonding or glue strips 232,234 operatively cooperate with each other, as well as with the folded closed or sealed side edge portion 218 and the stitched or sewn, closed or sealed end edge portion 222, so as to cause those portions or regions 236 of the plurality of paper plies which are interposed between the adhesive bonding or glue strip 232 and the inflation valve assembly, as exemplified by means of the closure cap 214, as well as those portions or regions 238 of the plurality of paper plies which are interposed between the adhesive bonding or glue strip 234 and the inflation valve assembly, as exemplified by means of the closure cap 214, to lie or be disposed in a substantially flattened condition or state.

It is therefore to be appreciated that in view of the provision of such adhesive bonding or glue strip structure 232,234, and in view of the fact that the plurality of paper plies are now fixedly secured upon all four sides surrounding the inflation valve assembly, as exemplified by means of the closure cap 214, those portions of the plurality of paper plies, which effectively form or define the inner annular periphery or rim wall portions of the apertures, openings, or holes through which the tubular body portion of the inflation valve assembly projects outwardly, will tend to remain in a substantially flattened state within the vicinity of the annular flange portion of the inflation valve assembly. Accordingly, those portions of the plurality of paper plies, which effectively form or define the annular periphery or inner rim wall portions of the apertures, openings, or holes, will not effectively move or be disposed away or remote from the annular flange portion of the inflation valve assembly so as not to be disposed within the immediate vicinity of, or become engaged with, the individual thread portions of the externally threaded tubular body member of the inflation valve assembly. In this manner, that portion of each one of the plurality of paper plies, which effectively forms or defines the annular periphery or inner rim wall portion of each aperture, opening, or hole, will not effectively tend to interfere with the threaded engagement and mounting of the threaded closure cap 214 upon the threaded tubular body member of the inflation valve assembly whereby proper closure and sealing of the inflation valve assembly can in fact be properly or assuredly attained or achieved.

It is to be lastly noted, in connection with the provision of the adhesive bonding or glue strips 232,234, that when the adhesive bonding or glue strips 232,234 are positioned upon the plurality of paper plies forming the dunnage or cargo air bag 210, the adhesive bonding or glue strips 232,234 are preferably disposed immediately radially outwardly or beyond the outer diametrical extent of the annular flange portion of the inflation valve assembly, as disclosed in phantom at 240, in order to achieve the desired flattened secured state for those portions of the plurality of paper plies which effectively form or define the inner annular periphery or rim wall portions of the apertures, openings, or holes through which the tubular body portion of the inflation valve assembly projects outwardly. It is further noted that the adhesive bonding or glue strips 232,234 should not, in effect, overlie the diametrical regional extent of the annular flange portion of the inflation valve assembly in view of the fact that such adhesive bonding or glue strips 232,234 would then interfere with the heat sealing of the annular flange portion of the inflation valve assembly to the inner wall portion of the inflatable bladder.

Thus, it may be seen that in accordance with the principles and teachings of the present invention, there has been provided a new and improved dunnage or cargo air bag which has incorporated therein a pair of glue or adhesive bonding strips which are located within the immediate vicinity of the inflation valve assembly. More particularly, the adhesive bonding or glue strips operatively cooperate with a folded edge portion of the dunnage or cargo air bag and a stitched or sewn edge portion of the dunnage or cargo air bag so as to effectively surround or circumscribe the inflation valve assembly. In this manner, the plurality of paper plies are able to be effectively secured in a substantially flattened state upon the four sides surrounding the inflation valve assembly whereby the portion of each one of the plurality of paper plies, which effectively forms or defines the inner, annular periphery or rim wall portion of each one of the apertures, holes, or openings through which, for example, the tubular body member of the inflation valve assembly projects outwardly, will not be disposed within the vicinity of the external thread portions of the tubular body member of the inflation valve assembly so as not to effectively interfere with the threaded engagement and secured mounting of the internally threaded closure cap upon the externally threaded tubular body member of the inflation valve assembly.

Obviously, many variations and modifications of the present invention are possible in light of the above teachings. It is therefore to be understood that within the scope of the appended claims, the present invention may be practiced otherwise than as specifically described herein.

What is claimed is:

1. A cargo air bag, comprising:
an inflatable bladder having an aperture defined therein;
a plurality of paper plies having a plurality of apertures respectively defined therewithin and enveloping said inflatable bladder such that said inflatable bladder is disposed internally within said plurality of paper plies;
a first closed side edge portion defined upon said cargo air bag as a result of said plurality of paper plies being folded over upon themselves along one side portion of said plurality of paper plies;
means for closing end portions of said plurality of paper plies so as to define a second closed end edge portion upon said cargo air bag which cooperates with said first closed side edge portion of said cargo air bag in defining a corner region of said cargo air bag;
an inflation valve assembly comprising a flange portion sealed to said inflatable bladder, and an externally threaded tubular body member projecting outwardly through said apertures defined within said inflatable bladder and said plurality of paper plies so as to be fluidically connectible to a source of pressurized air, said inflation valve assembly being disposed within said corner region of said cargo air bag such that said inflation valve assembly is partially circumscribed upon two sides thereof by said first closed side and second closed end edge portions of said cargo air bag; and
connection means for connecting together said plurality of paper plies within the vicinity of said inflation valve assembly and for cooperating with said first closed side and second closed end edge portions of said cargo air bag for additionally circumscribing said inflation valve assembly such that portions of said plurality of paper plies, interposed between said inflation valve assembly and said first closed side and second closed end edge portions of said cargo air bag, and between said inflation valve assembly and said connection means, are maintained in a substantially flattened state so as to not to engage threaded portions of said externally threaded tubular body member of said inflation valve assembly and thereby not interfere with the threaded engagement of a closure cap upon said externally threaded tubular body member of said inflation valve assembly.

2. The cargo air bag as set forth in claim 1, wherein:
said means for closing end portions of said plurality of paper plies comprises fabric means for covering said end portions of said plurality of paper plies, and stitching for sewing said fabric means onto said end portions of said plurality of paper plies.

3. The cargo air bag as set forth in claim 1, wherein:
said connection means comprises a plurality of adhesive strips.

4. The cargo air bag as set forth in claim 3, wherein:
said plurality of adhesive strips comprises a pair of adhesive strips.

5. The cargo air bag as set forth in claim 4, wherein:
said pair of adhesive strips extend inwardly from said first closed side and second closed end edge portions of said cargo air bag so as to intersect each other and form a corner region disposed diametrically opposite said corner region of said cargo air bag as defined by the cooperation of said first closed side and second closed end edge portions of said cargo air bag.

6. The cargo air bag as set forth in claim 5, wherein:
said pair of adhesive strips are disposed perpendicular to each other such that a first one of said pair of adhesive strips is disposed parallel to said first closed side edge portion of said cargo air bag while a second one of said pair of adhesive strips is disposed parallel to said second closed end edge portion of said cargo air bag.

7. The cargo air bag as set forth in claim 4, wherein:
said pair of adhesive strips are disposed within the immediate vicinity of said flange portion of said inflation valve assembly.

8. The cargo air bag as set forth in claim 4, wherein:
said pair of adhesive strips, together with said first closed side and second closed end edge portions of said cargo air bag, are disposed upon four sides of said inflation valve assembly so as to define a substantially square-shaped closure pattern surrounding said inflation valve assembly.

9. A cargo air bag including an inflatable bladder having an aperture defined therein; a plurality of paper plies having a plurality of apertures respectively defined therewithin and enveloping said inflatable bladder such that said inflatable bladder is disposed internally within said plurality of paper plies; a first closed side edge portion defined upon said cargo air bag as a result of said plurality of paper plies being folded over upon themselves along one side portion of said plurality of paper plies; means for closing end portions of said plurality of paper plies so as to define a second closed end edge portion upon said cargo air bag which cooperates with said first closed side edge portion of said cargo air bag in defining a corner region of said cargo air bag; and an inflation valve assembly comprising a flange portion sealed to said inflatable bladder, and an externally threaded tubular body member projecting outwardly through said apertures defined within said inflatable bladder and said plurality of paper plies so as to be fluidically connectible to a source of pressurized air, said inflation valve assembly being disposed within said corner region of said cargo air bag such that said inflation valve assembly is partially circumscribed upon two sides thereof by said first closed side and second closed end edge portions of said cargo air bag, the improvement comprising:
connection means for connecting together said plurality of paper plies within the vicinity of said inflation valve assembly and for cooperating with said first closed side and second closed end edge portions of said cargo air bag for additionally circumscribing said inflation valve assembly such that portions of said plurality of paper plies, interposed between said inflation valve assembly and said first closed side and second closed end edge portions of said cargo air bag, and between said inflation valve assembly and said connection means, are maintained in a substantially flattened state so as to not to engage threaded portions of said externally threaded tubular body member of said inflation valve assembly and thereby not interfere with the threaded engagement of a closure cap upon said externally threaded tubular body member of said inflation valve assembly.

10. The cargo air bag as set forth in claim 9, wherein:
said means for closing end portions of said plurality of paper plies comprises fabric means for covering said end portions of said plurality of paper plies, and stitching for sewing said fabric means onto said end portions of said plurality of paper plies.

11. The cargo air bag as set forth in claim 9, wherein:
said connection means comprises a plurality of adhesive strips.

12. The cargo air bag as set forth in claim 11, wherein:
said plurality of adhesive strips comprises a pair of adhesive strips.

13. The cargo air bag as set forth in claim 12, wherein:
said pair of adhesive strips extend inwardly from said first closed side and second closed end edge portions of said cargo air bag so as to intersect each other and form a corner region disposed diametrically opposite said corner region of said cargo air bag as defined by the cooperation of said first closed side and second closed end edge portions of said cargo air bag.

14. The cargo air bag as set forth in claim 13, wherein:
said pair of adhesive strips are disposed perpendicular to each other such that a first one of said pair of adhesive strips is disposed parallel to said first closed side edge portion of said cargo air bag while a second one of said pair of adhesive strips is disposed parallel to said second closed end edge portion of said cargo air bag.

15. The cargo air bag as set forth in claim 12, wherein:
said pair of adhesive strips are disposed within the immediate vicinity of said flange portion of said inflation valve assembly.

16. The cargo air bag as set forth in claim 12, wherein:
said pair of adhesive strips, together with said first closed side and second closed end edge portions of said cargo air bag, are disposed upon four sides of said inflation valve assembly so as to define a substantially square-shaped closure pattern surrounding said inflation valve assembly.

* * * * *